United States Patent
Memory

(10) Patent No.: US 7,779,769 B2
(45) Date of Patent: Aug. 24, 2010

(54) AGRICULTURAL IMPLEMENT WITH DENSE PHASE PRODUCT FLOW FROM A PRIMARY CONTAINER

(75) Inventor: Russell James Memory, Saskatoon (CA)

(73) Assignee: CNH Canada, Ltd., Saskatoon, SK (CA)

( * ) Notice: Subject to any disclaimer, the term of this patent is extended or adjusted under 35 U.S.C. 154(b) by 0 days.

(21) Appl. No.: 12/271,679

(22) Filed: Nov. 14, 2008

(65) Prior Publication Data

US 2010/0122648 A1    May 20, 2010

(51) Int. Cl.
A01C 7/00 (2006.01)
A01C 9/00 (2006.01)

(52) U.S. Cl. .............. 111/174; 111/175; 111/900; 111/925

(58) Field of Classification Search ........ 111/170, 111/174, 175, 186–188, 200, 900, 903, 904, 111/925

See application file for complete search history.

(56) References Cited

U.S. PATENT DOCUMENTS

| 524,474 | A | 8/1894 | Wade |
|---|---|---|---|
| 670,534 | A | 3/1901 | Carmical |
| 1,369,649 | A | 2/1921 | Gieseler |
| 2,062,295 | A | 12/1936 | Cary et al. |
| 2,171,205 | A | 8/1939 | Zinke |
| 2,193,738 | A | 3/1940 | Perrin |
| 2,559,183 | A | 7/1951 | Barnett |
| 2,671,690 | A | 3/1954 | Von Ehrenkrook |
| 2,814,531 | A | 11/1957 | Murray, Jr. |
| 2,937,049 | A | 5/1960 | Osawa |
| 3,197,261 | A | 7/1965 | Kauffman |
| 3,207,560 | A | 9/1965 | Brown |
| 3,376,897 | A | 4/1968 | Dolder et al. |
| 3,386,474 | A | 6/1968 | Kimmel |
| 3,387,895 | A | 6/1968 | Hochmuth et al. |
| 3,515,315 | A | 6/1970 | Kidd |
| 3,543,704 | A | 12/1970 | Hansen |
| 3,548,765 | A | 12/1970 | Grataloup |
| 4,036,408 | A | 7/1977 | Dugge |
| 4,082,364 | A | 4/1978 | Krambrock |
| 4,200,412 | A | 4/1980 | Steele |
| 4,244,522 | A | 1/1981 | Hartwig |
| 4,264,243 | A | 4/1981 | Bentzen-Bilkvist |

(Continued)

FOREIGN PATENT DOCUMENTS

BR    9501580-9 A    11/1995

(Continued)

*Primary Examiner*—Christopher J. Novosad
(74) *Attorney, Agent, or Firm*—Rebecca L. Henkel; John William Stader

(57) ABSTRACT

An agricultural implement for distributing a product by dense phase flow is disclosed. The agricultural implement comprises a frame and a product distribution system configured to distribute the product to different positions on the frame by dense phase flow. The product distribution system includes a primary container configured to accommodate the product and includes a primary container inlet and a product exit. The product distribution system also includes a pressure supply assembly configured to provide a pressurized fluid and is in fluid communication with the primary container through the primary container inlet. The product distribution system also includes a distribution conduit that includes a conduit first end connected to the product exit and a conduit discharge end opposite the conduit first end.

21 Claims, 5 Drawing Sheets

U.S. PATENT DOCUMENTS

| | | | |
|---|---|---|---|
| 4,280,419 A | 7/1981 | Fischer | |
| 4,379,664 A | 4/1983 | Klein et al. | |
| 4,413,935 A | 11/1983 | Smith et al. | |
| 4,506,704 A | 3/1985 | Boom et al. | |
| 4,553,882 A | 11/1985 | Knappertz | |
| 4,562,779 A | 1/1986 | Briggs | |
| 4,674,922 A | 6/1987 | Federhen et al. | |
| 4,738,770 A | 4/1988 | Hastings et al. | |
| 4,779,765 A | 10/1988 | Neumeyer | |
| 4,793,743 A | 12/1988 | Grodecki et al. | |
| 4,843,983 A | 7/1989 | Olson | |
| 4,872,785 A | 10/1989 | Schrage et al. | |
| 5,033,914 A | 7/1991 | Wuertele et al. | |
| 5,069,583 A | 12/1991 | Caldwell | |
| 5,156,102 A | 10/1992 | Andersen | |
| 5,161,473 A | 11/1992 | Landphair et al. | |
| 5,240,355 A | 8/1993 | Hudalla | |
| 5,379,706 A | 1/1995 | Gage et al. | |
| 5,392,722 A | 2/1995 | Snipes et al. | |
| 5,407,305 A | 4/1995 | Wallace | |
| 5,494,381 A | 2/1996 | Heyl et al. | |
| 5,575,225 A | 11/1996 | Smith et al. | |
| 5,749,682 A | 5/1998 | Epting | |
| 5,813,801 A | 9/1998 | Newbolt et al. | |
| 5,878,679 A | 3/1999 | Gregor et al. | |
| 5,927,217 A | 7/1999 | Halford et al. | |
| 6,047,652 A | 4/2000 | Prairie et al. | |
| 6,253,693 B1 | 7/2001 | Mayerle et al. | |
| 6,298,797 B1 | 10/2001 | Mayerle et al. | |
| 6,308,645 B1 | 10/2001 | Newkirk et al. | |
| 6,308,646 B1 | 10/2001 | Luxon | |
| 6,311,727 B1 | 11/2001 | Campau | |
| 6,343,896 B1 | 2/2002 | Goodier et al. | |
| 6,499,413 B2 | 12/2002 | Kleinknecht et al. | |
| 6,505,569 B1 | 1/2003 | Richard | |
| 6,581,532 B1 | 6/2003 | Hagen et al. | |
| 6,584,919 B2 | 7/2003 | McQuinn | |
| 6,644,225 B2 | 11/2003 | Keaton | |
| 6,648,558 B1 | 11/2003 | Shultz | |
| 6,742,464 B1 | 6/2004 | Chiu | |
| 6,782,835 B2 | 8/2004 | Lee et al. | |
| 6,854,405 B2 | 2/2005 | Memory | |
| 6,899,042 B1 | 5/2005 | Kowalchuk | |
| 6,904,851 B2 | 6/2005 | Memory | |
| 6,928,938 B2 | 8/2005 | Memory | |
| 6,928,939 B1 | 8/2005 | Johnson et al. | |
| 6,935,254 B2 | 8/2005 | Ostrander et al. | |
| 7,017,502 B2 | 3/2006 | Quam et al. | |
| 7,040,242 B2 | 5/2006 | Memory | |
| 7,048,475 B2 | 5/2006 | Cloue et al. | |
| 7,101,120 B2 | 9/2006 | Jurkovich | |
| 7,213,525 B2 | 5/2007 | Meyer et al. | |
| 7,267,061 B2 | 9/2007 | Mayerle | |
| 7,270,064 B2 | 9/2007 | Kjelsson et al. | |
| 2006/0243179 A1 | 11/2006 | Landphair et al. | |
| 2007/0022928 A1 | 2/2007 | Kowalchuk | |
| 2007/0181048 A1 | 8/2007 | Pleyer | |

FOREIGN PATENT DOCUMENTS

| | | |
|---|---|---|
| DE | 3528301 A1 | 2/1987 |
| DE | 19620016 A1 | 11/1997 |
| DE | 10006811 A1 | 1/2001 |
| EP | 0331302 A1 | 6/1989 |
| GB | 2064021 | 6/1981 |
| GB | 2096085 A | 10/1982 |
| GB | 2222131 A | 2/1990 |
| JP | 61111227 A | 5/1986 |
| JP | 01013311 A | 1/1989 |
| JP | 06092454 A | 4/1994 |
| JP | 2003070329 A | 3/2003 |
| JP | 2003081425 A | 3/2003 |

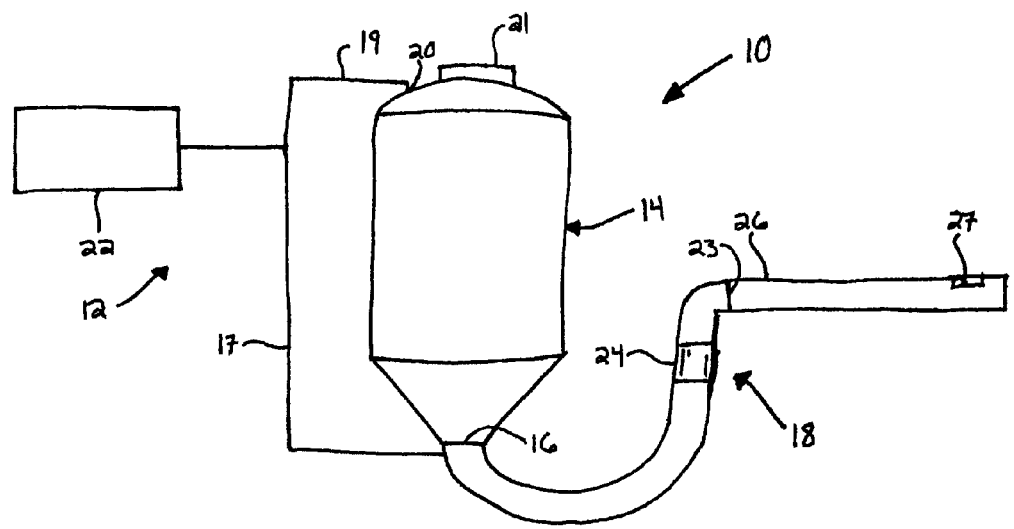
FIG. 2
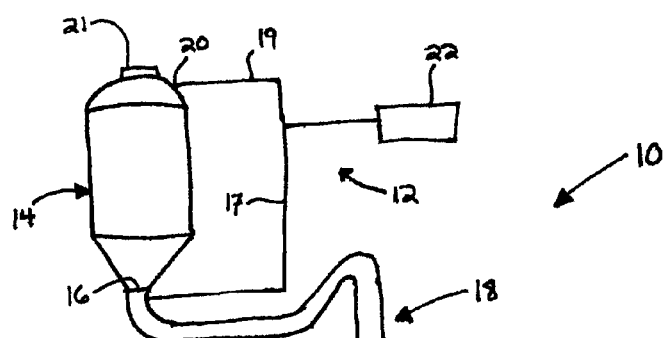
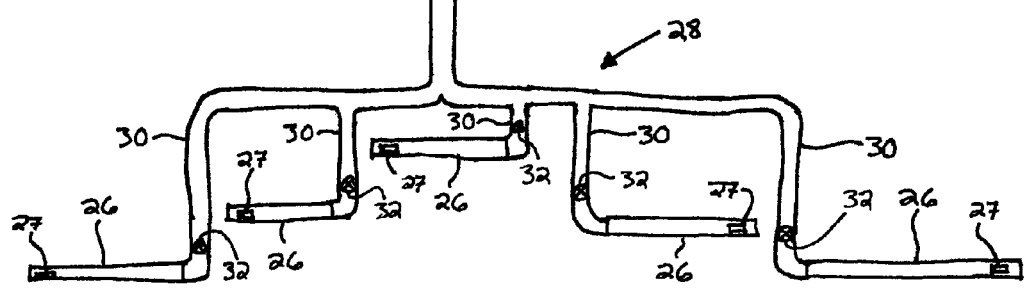
FIG. 3

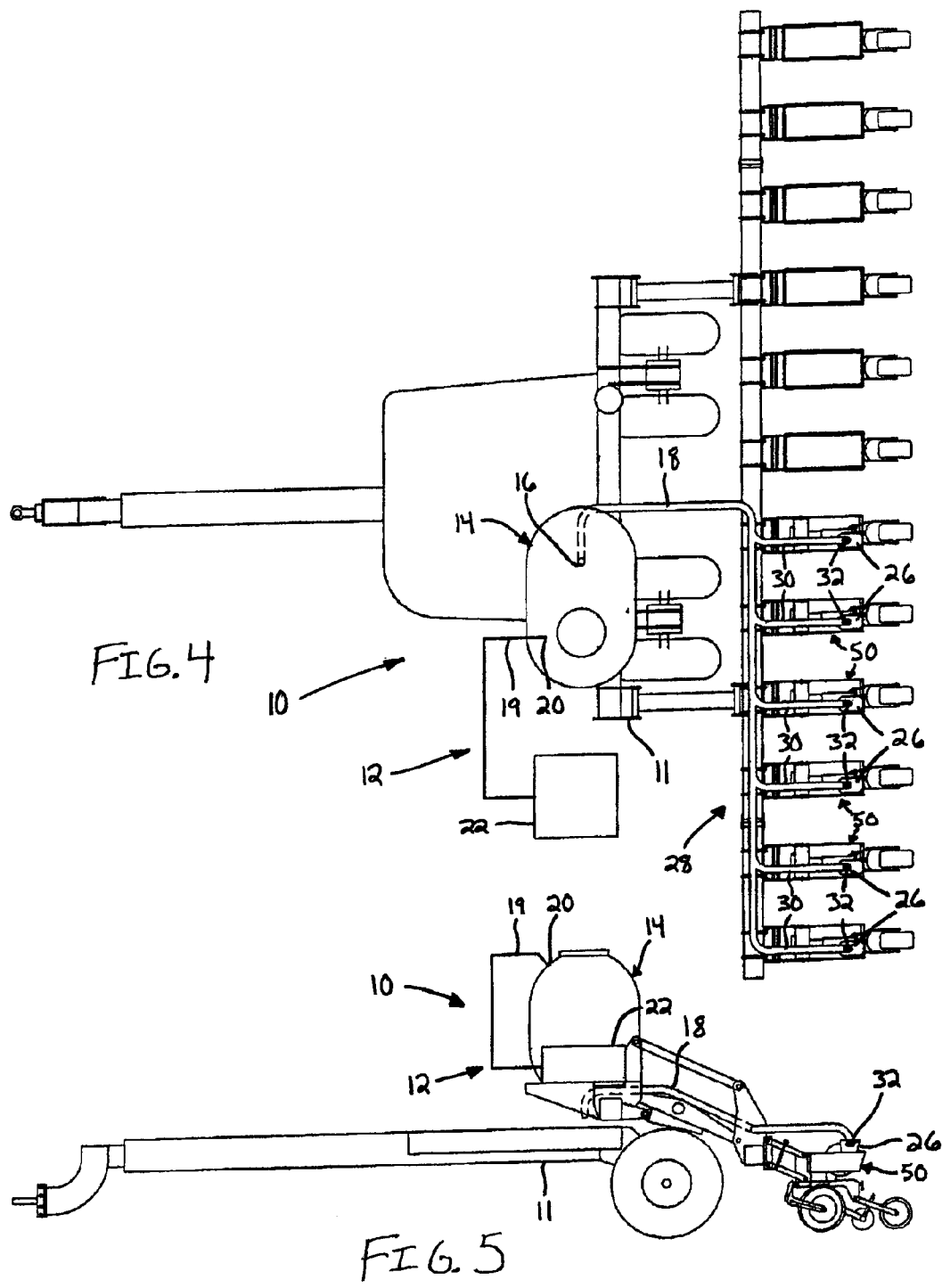

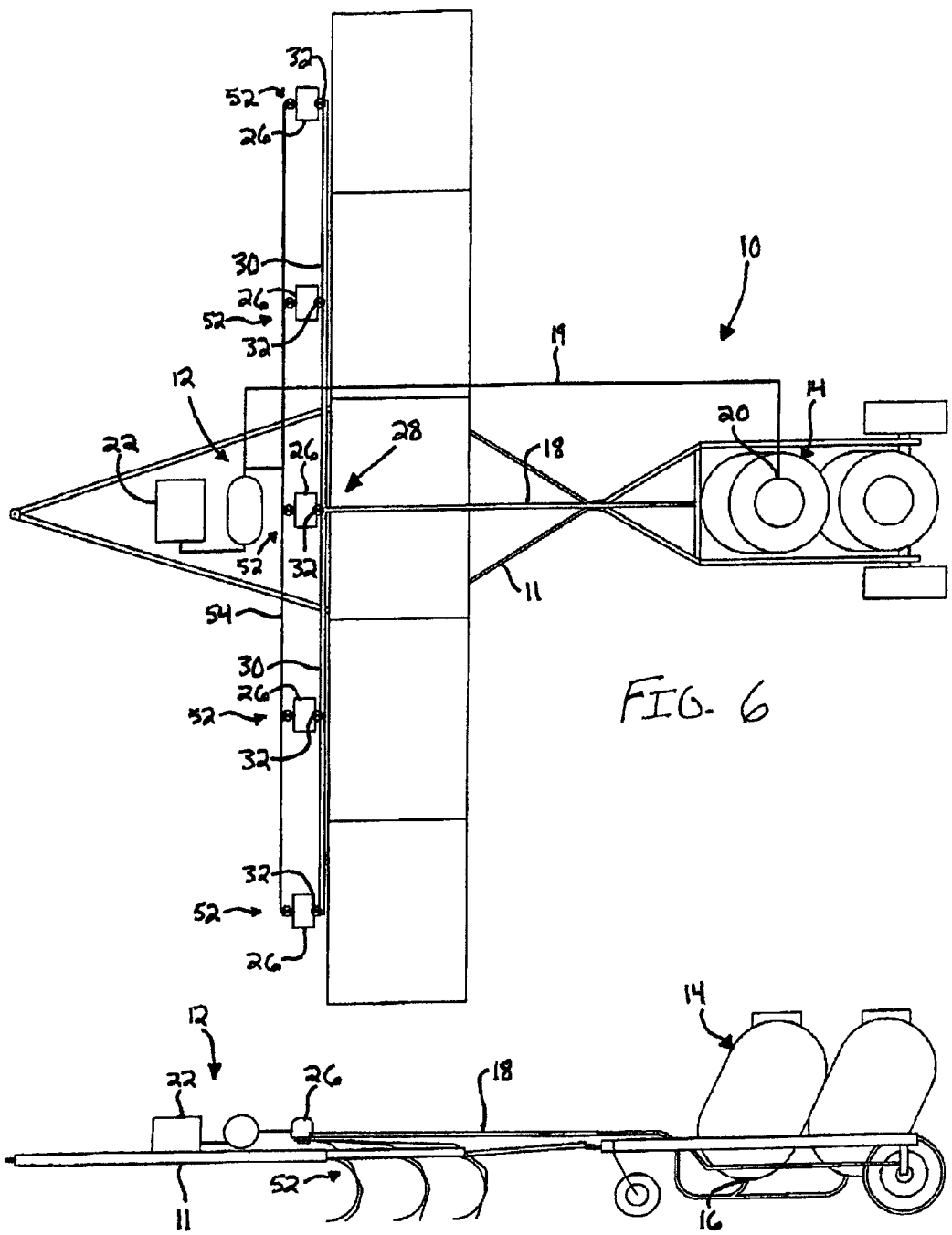

AGRICULTURAL IMPLEMENT WITH DENSE PHASE PRODUCT FLOW FROM A PRIMARY CONTAINER

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates to product distribution systems for agricultural implements, and particularly product distribution systems with a plurality of distribution conduits that operate at low pressure.

BACKGROUND OF THE INVENTION

Agricultural implements, such as planters and seed dispensers, typically include a system of conduits through which a dispensed product, such as seed, is distributed. In addition, a fluid, such as pressurized air, also moves through the system of conduits to move the dispensed product to different locations on the agricultural implement. For example, some current agricultural implements include conduits through which the product is transferred from a primary container to one or more metering devices, such as singulators. However, most current designs use a large volume of fluid at low pressure to move a low volume of the dispensed product; as a result, current designs are relatively inefficient.

Moving the dispensed product with a low pressure fluid has other drawbacks in addition to low system efficiency. For example, in order to provide an adequate volume of the product to the metering devices, a relatively high air flow rate is used in which a relatively low volume of the product is transported in a high volume of the fluid, which is referred to as dilute phase flow. A high air flow rate results in high product velocity, which can in turn damage the dispensed product and the conduits of the agricultural implement. As another example, the dispensed product may become lodged in the conduits if the air velocity falls below the critical level. Most current systems do not have sufficient power to dislodge the product within the conduits. As a result, the lodged product may require manual removal by an operator which may in turn result in down-time of the agricultural implement and in some cases loss of product.

Further still, the system of conduits included with most current designs provides additional drawbacks. For example, some systems include multiple conduits that each connect the primary container to a single metering device. In some cases, the agricultural implement may include a dozen or more metering devices, each having a conduit connected to the primary container. A relatively large number of conduits increases cost and complexity, and, to some individuals, reduces the aesthetic appeal of current designs.

Considering the limitations of current product delivery systems for agricultural implements, it would be desirable to have a product delivery system that is more efficient than previous designs and is less likely to permit unwanted lodging of a dispensed product within the system conduits.

SUMMARY OF THE INVENTION

In some embodiments, the present invention provides an agricultural implement for distributing a product by dense phase flow comprising a frame and a product distribution system configured to distribute the product to different positions on the frame by dense phase flow. The product distribution system includes a primary container configured to accommodate the product and includes a primary container inlet and a product exit. The product distribution system also includes a pressure supply assembly configured to provide a pressurized fluid and is in fluid communication with the primary container through the primary container inlet. The product distribution system also includes a distribution conduit that includes a conduit first end connected to the product exit and a conduit discharge end opposite the conduit first end.

In some embodiments, the product exit is opposite the primary container inlet.

In some embodiments, the cross-sectional area of the distribution conduit is constant.

In some embodiments, the agricultural implement includes a secondary container in fluid communication with the conduit discharge end.

In some embodiments, the agricultural implement includes a metering device in fluid communication with the secondary container.

In some embodiments, the distribution conduit includes a flexible section.

In some embodiments, the distribution conduit is in fluid communication with a plurality of branch distribution conduits that each include a conduit discharge end.

In some embodiments, each of the branch distribution conduits includes a valve.

In some embodiments, the distribution conduit had a diameter of at most 2 inches.

In some embodiments, the present invention provides an agricultural implement for distributing a product by dense phase flow comprising a frame and a primary container configured to accommodate the product. The primary container is connected to the frame and has a product exit. The agricultural implement also includes a distribution conduit that has a conduit first end connected to the product exit and a conduit discharge end opposite the conduit first end. The agricultural implement further includes a pressure supply assembly in fluid communication with an end of the primary container opposite the product exit.

In some embodiments, the agricultural implement further comprises a second distribution conduit that includes a conduit first end connected to the product exit and a conduit discharge end opposite the conduit first end.

In some embodiments, each of the first distribution conduit and the second distribution conduit is in fluid communication with a branch distribution conduit.

In some embodiments, the agricultural implement further comprises a secondary container connected to the conduit discharge end, a second primary container in fluid communication with the pressure supply assembly and that includes a second product exit, and a second distribution conduit that includes a conduit first end connected to the second product exit and a conduit discharge end in fluid communication with the secondary container.

In some embodiments, the present invention provides a method of moving a dispensed product on an agricultural implement by dense phase flow, comprising the steps of:

positioning the dispensed product within a primary container adjacent to a product exit; supplying a pressurized fluid to the primary container through a primary container inlet; and moving the dispensed product through the product exit and into a distribution conduit.

In some embodiments, frontward portions of the dispensed product constantly move to vacate a space, and rearward portions of the dispensed product move to occupy the space vacated by the frontward portions.

In some embodiments, the pressurized fluid has a pressure less than 1 bar.

In some embodiments, the dispensed product flows through the distribution conduit at a rate of at most 1 m/s.

In some embodiments, the method further comprises the step of delivering the dispensed product to a plurality of branch distribution conduits.

In some embodiments, the method further comprises the step of delivering the dispensed product to a plurality of secondary containers through the plurality of branch distribution conduits.

In some embodiments, the method further comprises the step of selectively controlling delivery of the dispensed product to the plurality of secondary containers with a plurality of valves, a single valve controlling delivery of the dispensed product through one of the plurality of branch distribution conduits.

In some embodiments, the method further comprises the step of replenishing the dispensed product within one of the plurality of secondary containers when an amount of the product within the one of the plurality of secondary containers falls below a threshold.

The foregoing and other objects and advantages of the invention will appear in the detailed description that follows. In the description, reference is made to the accompanying drawings that illustrate a preferred embodiment of the invention.

BRIEF DESCRIPTION OF THE DRAWINGS

The invention will hereafter be described with reference to the accompanying drawings, wherein like reference numerals denote like elements, and:

FIG. 2 is a schematic representation of the system of the present invention;

FIG. 3 is a schematic representation of an alternative embodiment of the system of the present invention;

FIG. 4 is a top plan view of an agricultural planter including an embodiment of the system of the present invention;

FIG. 5 is a side elevation view of the agricultural planter of FIG. 4;

FIG. 6 is a top plan view of an agricultural tilling implement including an embodiment of the system of the present invention;

FIG. 7 is a side elevation view of the agricultural tilling implement of FIG. 6;

DETAILED DESCRIPTION OF THE PREFERRED EMBODIMENT

Figure 1:
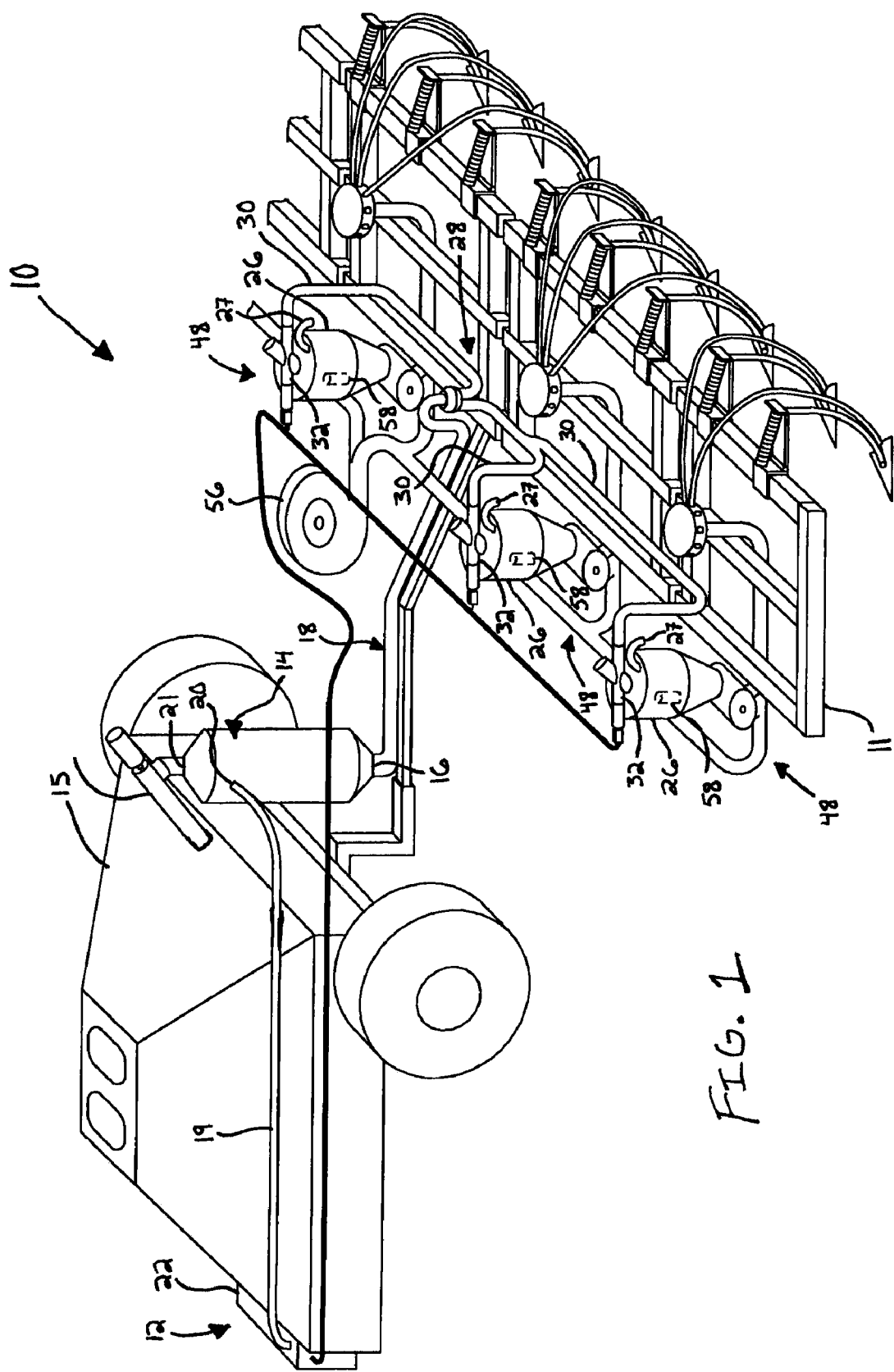
FIG. 1 is a perspective view of an agricultural air seeder including a system for distributing a dispensed product to various locations on the seeder according to the present invention.

The following applications, each having a filing date of Nov. 14, 2008, are hereby incorporated by reference as if fully set forth herein: U.S. application Ser. No. 12/271,618 ("Sectional Distribution of Granular Product"); U.S. application Ser. No. 12/271,723 ("Device and Method for Dense Phase Transport of Seed"); U.S. application Ser. No. 12/271,745 ("Agricultural Implement with Dense Phase Product Dispensing and Purging"); U.S. application Ser. No. 12/271,765 ("Valve and Method for Dense Phase Flow Control"); U.S. application Ser. No. 12/271,787 ("Dense Phase Distribution Branch"); U.S. application Ser. No. 12/271,808 ("Pressure Supply Assembly for an Agricultural Implement with Dense Phase Product Flow"); U.S. application Ser. No. 12/271,816 ("Dense Phase Induction System and Method"); and U.S. application Ser. No. 12/271,822 ("Granular Containment Assembly and Method").

Referring to FIGS. 1-7, FIG. 1 shows a system 10 of the present invention positioned on a frame 11 of an agricultural air seeder; FIGS. 2 and 3 show a schematic representation of the system 10; FIGS. 4 and 5 show the system 10 positioned on an agricultural planter; and FIGS. 6 and 7 show the system positioned on an agricultural tilling implement. It should be noted that FIG. 4 only shows the system 10 connected to one side of the agricultural implement for simplicity. A physical implementation of the system 10 would also include additional components connected to the other side of the agricultural implement, or alternatively, a second system 10 could be connected to the other side of the agricultural implement. The system 10 for distributing a dispensed product to various locations on the agricultural implement includes a pressure supply assembly 12 that is in fluid communication with a primary container 14 and a distribution conduit 18. During a dispensing operation, the primary container 14 accommodates the product before a pressurized fluid and/or gravity forces the product through a product exit 16 of the primary container 14 and into the distribution conduit 18.

Generally, the primary container 14 includes the product exit 16 and a primary container inlet 20 for fluid communication with the distribution conduit 18 and the pressure supply assembly 12, respectively, and a hatch 21 through which the dispensed product may be added to the primary container 14. The primary container 14 is an otherwise sealed container to prevent the pressurized fluid from leaking to the outside environment. In some embodiments, the primary container inlet 20 is near an end of the primary container 14 opposite the product exit 16. In the context of the primary container 14, the term 'opposite' should be understood to mean that the primary container inlet 20 and the product exit 16 are non-adjacent, and the primary container inlet 20 is spaced apart from an upper surface of the product when the primary container 14 is filled with the product. A conventional hopper (not shown) may be positioned adjacent the hatch 21 to supply the product to the primary container 14 before sealing the hatch 21. Additionally, and referring to FIG. 1, a product tank 15 may supply the product to the primary container 14 through an auger assembly 25 and the hatch 21. The primary container 14 may be positioned in a vertical configuration to aid flow of the product into the distribution conduit 18, although other configurations are possible.

Generally, the pressure supply assembly 12 includes a container inlet conduit 19 and, optionally, a container bypass conduit 17 that are in fluid communication with a pressure source 22. The container inlet conduit 19 is in fluid communication with the primary container inlet 20. The container inlet conduit 19 may be in fluid communication with the container bypass conduit 17 (FIGS. 2 and 3) that connects to the distribution conduit 18 adjacent the product exit 16. The container bypass conduit 17 may aid flow of the product within the distribution conduit 18. The pressure source 22 supplies a pressurized fluid, for example, air, to the primary container 14 and may be, for example, a compressor. The pressure source 22 may be advantageously designed or selected such that it provides a pressurized fluid at a pressure less than 1 bar. Some jurisdictions do not require reservoir/container certification if a pressure of 1 bar is not exceeded.

As briefly described above, the product stored in the primary container 14 passes through the product exit 16 into the distribution conduit 18. The distribution conduit 18 guides the product to another location or storage device on the agricultural implement. The distribution conduit 18 advantageously has a diameter of 2 inches. The distribution conduit 18 may have a constant diameter or the diameter may increase somewhat from the product exit 16 to a conduit discharge end 23. The distribution conduit 18 may include a combination of horizontal, vertical, diagonal, and elbow sections. In addition, the distribution conduit 18 may include one or more flexible sections 24 (FIG. 2) that permit relative motion of different sections of the distribution conduit 18. The flexible section 24 may be advantageous, for example, if deformation of the distribution conduit 18 is likely to occur due to the positions of the components of the system 10 on the agricultural implement. Deformation of the distribution conduit 18 may occur, for example, with a large agricultural implement that includes multiple sections that move relative to one another to accommodate uneven surfaces. As another example, some agricultural implements include multiple sections that move relative to one another to provide different configurations for highway and field travel. The flexible section 24 may be any type of flexible conduit known in the art.

Referring to FIGS. 2-3, in some embodiments, the conduit discharge end 23 of the distribution conduit 18 may be in fluid communication with a secondary container 26 at an end of the distribution conduit 18 opposite the product exit 16. The secondary container 26 may be a reservoir for a product metering device, for example, a low pressure metering device 48 (FIG. 1), a vacuum metering device 50 (FIGS. 4 and 5), or a tillage metering device 52 (FIGS. 6 and 7). Referring to FIG. 1, the low pressure metering device 48 may receive pressurized fluid from a separate blower assembly 56 to move the metered product by dilute phase flow. Similarly and referring to FIG. 6, the tillage metering device 52 may receive pressurized fluid directly from the pressure supply assembly 12 through a metering conduit 54 for product metering. Those skilled in art will also recognize other similar agricultural implements and metering devices with which the system 10 may be used.

The secondary container 26 may also include a vent 27 through which the pressurized fluid can exit the system 10 after passing through the distribution conduit 18. Alternatively, the conduit discharge end 23 may be open to atmospheric pressure and deliver the product to an open secondary container 26, thereby providing an alternative vent for the pressurized fluid. Referring to FIGS. 1, 3, 4, and 6, in some embodiments, the distribution conduit 18 may instead connect to a branch conduit assembly 28 that includes a plurality of branch distribution conduits 30 and a secondary container 26 connected to each of the branch distribution conduits 30. Each of the branch distribution conduits 30 may include a valve 32 to control product flow as described in further detail below.

The product advantageously flows within the distribution conduit 18 in dense phase flow. Dense phase flow can be described as a flow in which product is extruded from the system 10. The leading edge of the dispensed product is moved by the pressurized fluid through the distribution conduit 18. Frontward portions of the dispensed product constantly move forward, and rearward portions of the dispensed product move forward to occupy the space vacated by the frontward portions. In addition, the product flows at a relatively low velocity, for example, 1 m/s or less, in a low volume of pressurized fluid relative to the volume of the product. Further still, an operating pressure of 1 bar may result in a flow of 100 pounds of the product per one pound of the pressurized fluid. During a dispensing operation, the secondary container 26 is nearly filled and replenished when the amount of the product within the secondary container 26 falls below a threshold. The amount of the product within the secondary container 26 may be monitored by a sensor 58 (FIG. 1) and automatically replenished when necessary. In addition, a valve, such as the valves 32, may prevent additional product from entering the secondary container 26 when the amount of the product within the secondary container 26 exceeds the threshold. As a result, flow of the product will stop in the distribution conduit 18 when the valve 32 is closed. However, pressure from the pressure supply assembly 12 is sufficient to restart flow of the product when the valve 32 opens.

The product also advantageously flows through the branch conduit assembly 28 in dense phase flow. During a dispensing operation, the secondary containers 26 are nearly filled and replenished independently when necessary. Each secondary container 26 may include a sensor 58 to monitor the amount of the product therein. However, only one of the valves 32 is opened to permit the product to pass there through at a given time. As a result, flow of the product will stop in all but one of the branch distribution conduits 30, but the pressure from the pressure supply assembly 12 is sufficient to restart flow of the product when a different valve 32 opens. In addition, the sensors 58 in different secondary containers 26 may be positioned to provide different filling thresholds, which may prevent the sensors 58 from indicating that multiple secondary containers 26 need to be filled at the same time. The secondary containers 26 may be charged at the beginning of a dispensing operation in a similar manner; that is, only one of the valves 32 is opened at a given time. Opening and closing of the valves 32 may be controlled by an electronic controller (not shown). The electronic controller may be any appropriate device known in the art, such as a programmable logic controller.

Figure 8:
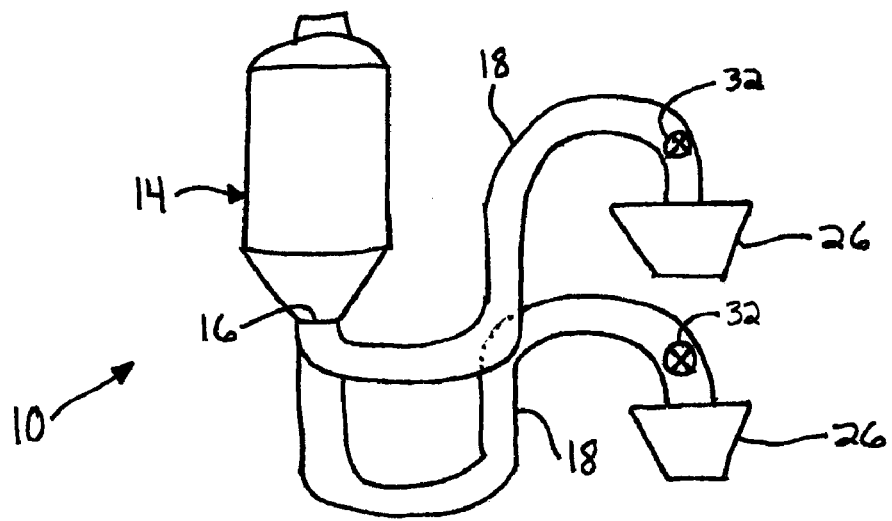
FIG. 8 is a schematic representation of an embodiment of the system of the present invention including multiple distribution conduits.
Figure 9:
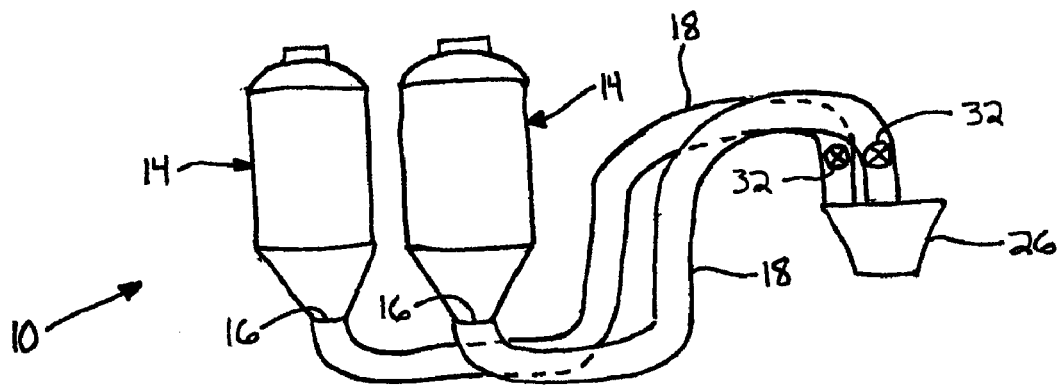
FIG. 9 is a schematic representation of an embodiment of the system of the present invention including multiple distribution conduits and a single secondary container.
Figure 10:
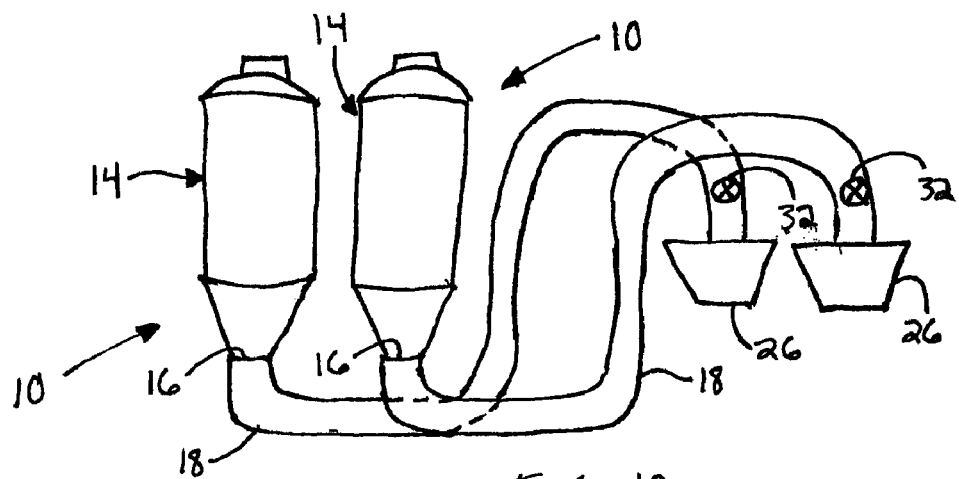
FIG. 10 is a schematic representation of an embodiment of the system of the present invention including multiple distribution conduits, primary containers, and secondary containers.

Referring to FIGS. 8-10, the system may alternatively include multiple primary containers 14 or distribution conduits 18 that may be advantageous, for example, for different types of planting operations. Referring to FIG. 8, a configuration is shown in which the system 10 includes two distribution conduits 18 connected to the product exit 16 and in fluid communication with the primary container 14. Each of the distribution conduits 18 is in fluid communication with a different secondary container 26. Product may flow through both distribution conduits 18 simultaneously or valves 32 may be included to selectively control product flow in the distribution conduits 18. Each of the distribution conduits 18 may also connect to a branch conduit assembly 28 as described above. Referring to FIG. 9, a configuration is shown in which the system 10 includes two primary containers 14, each in fluid communication with a different distribution conduit 18. The distribution conduits 18 are in fluid communication with a single secondary container 26. Each of the primary containers 14 may be in fluid communication with two distribution conduits 18 as described above. In addition, each of the distribution conduits 18 may also connect to a branch conduit assembly 28 as described above. Those skilled in the art will appreciate that the configuration shown in FIG. 9 may effectively double the capacity of the system 10 relative to the configurations described above. Referring to FIG. 10, a configuration is shown in which the agricultural implement includes two separate systems 10. Each of the distribution conduits 18 may connect to a branch conduit assembly 28 as described above. In addition, each of the primary containers 14 may be in fluid communication with two distribution conduits 18 as described above. Those skilled in art will appreciate that the configuration shown FIG. 10 may provide a double-shoot operation or a blended operation depending how the products are metered after entering the secondary containers 26.

The present invention provides an efficient system in which the product flows from different locations on the agricultural implement without damaging components of the agricultural implement. The system may be up to 50% more efficient than current designs that use dilute phase product flow. The present invention advantageously provides a system in which flow of the product may be stopped without the product becoming lodged in the system conduits upon restarting flow of the product. In addition, the present invention advantageously provides a relatively compact design that operates in a manner that may be easily understood by an operator.

It is specifically intended that the present invention not be limited to the embodiments and illustrations contained herein, but include modified forms of those embodiments including portions of the embodiments and combinations of elements of different embodiments as come within the scope of the following claims.

I claim:

1. An agricultural implement for distributing a product by dense phase flow, comprising:
    a frame;
    a plurality of tillage metering devices mounted on said frame;
    a product distribution system configured to distribute the product to different positions on the frame by dense phase flow, including:
        a primary container configured to accommodate the product and including a primary container inlet and a product exit;
        a pressure supply assembly configured to provide a pressurized fluid and being in fluid communication with the primary container through the primary container inlet;
        a distribution conduit having a conduit first end connected to the product exit and a conduit discharge end opposite the conduit first end.

2. The agricultural implement of claim 1, wherein the product exit is opposite the primary container inlet.

3. The agricultural implement of claim 1, wherein the cross-sectional area of the distribution conduit is constant.

4. The agricultural implement of claim 1, further comprising a secondary container in fluid communication with the conduit discharge end.

5. The agricultural implement of claim 4, further comprising a metering device in fluid communication with the secondary container.

6. The agricultural implement of claim 1, wherein the distribution conduit includes a flexible section.

7. The agricultural implement of claim 1, wherein the distribution conduit is in fluid communication with a plurality of branch distribution conduits each having a conduit discharge end.

8. The agricultural implement of claim 7, wherein each of the branch distribution conduits includes a valve.

9. The agricultural implement of claim 1, wherein the distribution conduit has a diameter of 2 inches.

10. An agricultural implement for distributing a product by dense phase flow, comprising:
    a frame;
    a plurality of tillage metering devices mounted on said frame;
    a primary container configured to accommodate the product, and the primary container connected to the frame and having a product exit;
    a distribution conduit having a conduit first end connected to the product exit and a conduit discharge end opposite the conduit first end; and
    a pressure supply assembly in fluid communication with an end of the primary container opposite the product exit.

11. The agricultural implement of claim 10, further comprising a second distribution conduit having a conduit first end connected to the product exit and a conduit discharge end opposite the conduit first end.

12. The agricultural implement of claim 11, wherein each of the first distribution conduit and the second distribution conduit is in fluid communication with a branch distribution conduit.

13. The agricultural implement of claim 10, further comprising:
    a secondary container connected to the conduit discharge end;
        a second primary container in fluid communication with the pressure supply assembly and having a second product exit;
        a second distribution conduit having a conduit first end connected to the second product exit and a conduit discharge end in fluid communication with the secondary container.

14. A method of moving a dispensed product on an agricultural implement by dense phase flow, comprising the steps of:
    positioning the dispensed product within a primary container adjacent to a product exit;
    supplying a pressurized fluid to the primary container through a primary container inlet;
    moving the dispensed product through the product exit and into a distribution conduit;
    allowing said product to be placed in the ground from a plurality of tillage metering devices.

15. The method of claim 14, wherein frontward portions of the dispensed product constantly move to vacate a space, and rearward portions of the dispensed product move to occupy the space vacated by the frontward portions.

16. The method of claim 14, wherein the pressurized fluid has a pressure less than 1 bar.

17. The method of claim 14, wherein the dispensed product flows through the distribution conduit at a rate of at most 1 m/s.

18. The method of claim 14, further comprising the step of delivering the dispensed product to a plurality of branch distribution conduits.

19. The method of claim 18, further comprising the step of delivering the dispensed product to a plurality of secondary containers through the plurality of branch distribution conduits.

20. The method of claim 19, further comprising the step of selectively controlling delivery of the dispensed product to the plurality of secondary containers with a plurality of valves, a single valve controlling delivery of the dispensed product through one of the plurality of branch distribution conduits.

21. The method of claim 20, further comprising the step of replenishing the dispensed product within one of the plurality of secondary containers when an amount of the product within the one of the plurality of secondary containers falls below a threshold.

* * * * *